(12) United States Patent
Takayama et al.

(10) Patent No.: US 10,205,870 B2
(45) Date of Patent: Feb. 12, 2019

(54) IMAGE CAPTURING APPARATUS AND CONTROL METHOD THEREOF

(71) Applicant: CANON KABUSHIKI KAISHA, Tokyo (JP)

(72) Inventors: Kazunori Takayama, Hachioji (JP); Toshihiro Mochizuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/486,851

(22) Filed: Apr. 13, 2017

(65) Prior Publication Data

US 2017/0310877 A1   Oct. 26, 2017

(30) Foreign Application Priority Data

Apr. 22, 2016   (JP) ................................. 2016-086576

(51) Int. Cl.
  *H04N 5/232* (2006.01)
  *H04N 5/369* (2011.01)
  *H04N 5/378* (2011.01)

(52) U.S. Cl.
  CPC ....... *H04N 5/23212* (2013.01); *H04N 5/3696* (2013.01); *H04N 5/378* (2013.01)

(58) Field of Classification Search
  CPC ... H04N 5/23212; H04N 5/3696; H04N 5/378
  See application file for complete search history.

(56) References Cited

U.S. PATENT DOCUMENTS

| 8,159,580 B2 | 4/2012 | Suzuki et al. |
| 8,830,354 B2 | 9/2014 | Nakaoka |
| 2012/0007997 A1* | 1/2012 | Oikawa ................. G03B 13/36 348/208.6 |
| 2015/0241205 A1 | 8/2015 | Nobayashi |

FOREIGN PATENT DOCUMENTS

| JP | 2007-325139 A | 12/2007 |
| JP | 2012-155095 A | 8/2012 |
| JP | 2014-074891 A | 4/2014 |

OTHER PUBLICATIONS

U.S. Appl. No. 15/487,605, filed Apr. 14, 2017 (Takayama et al.).
U.S. Appl. No. 15/486,879, filed Apr. 13, 2017 (Mochizuki et al.).

* cited by examiner

*Primary Examiner* — Twyler L Haskins
*Assistant Examiner* — Fayez Bhuiyan
(74) *Attorney, Agent, or Firm* — Venable LLP

(57) ABSTRACT

An image capturing apparatus reads out a signal from pixels of an image sensor, sets a region in which a plurality of signals having different viewpoints are read out from each pixel of the image sensor, acquires first depth information for detecting an object using a signal read out from a first signal readout region, acquires evaluation information for detecting a focus state of an object using a read signal, and controls a signal readout amount of the first signal readout region based on the focus state determined based on the evaluation information.

14 Claims, 13 Drawing Sheets

FIG. 2

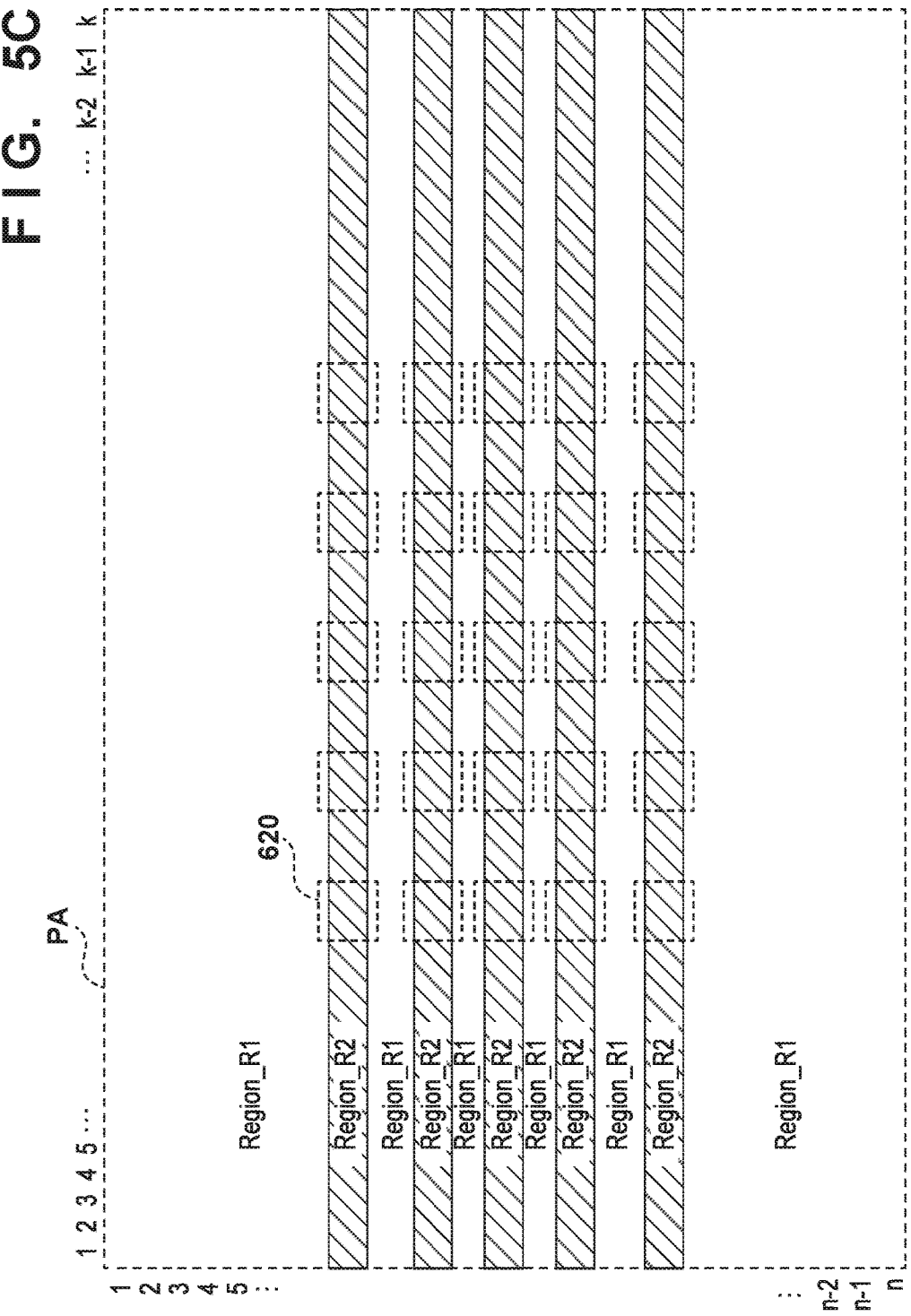

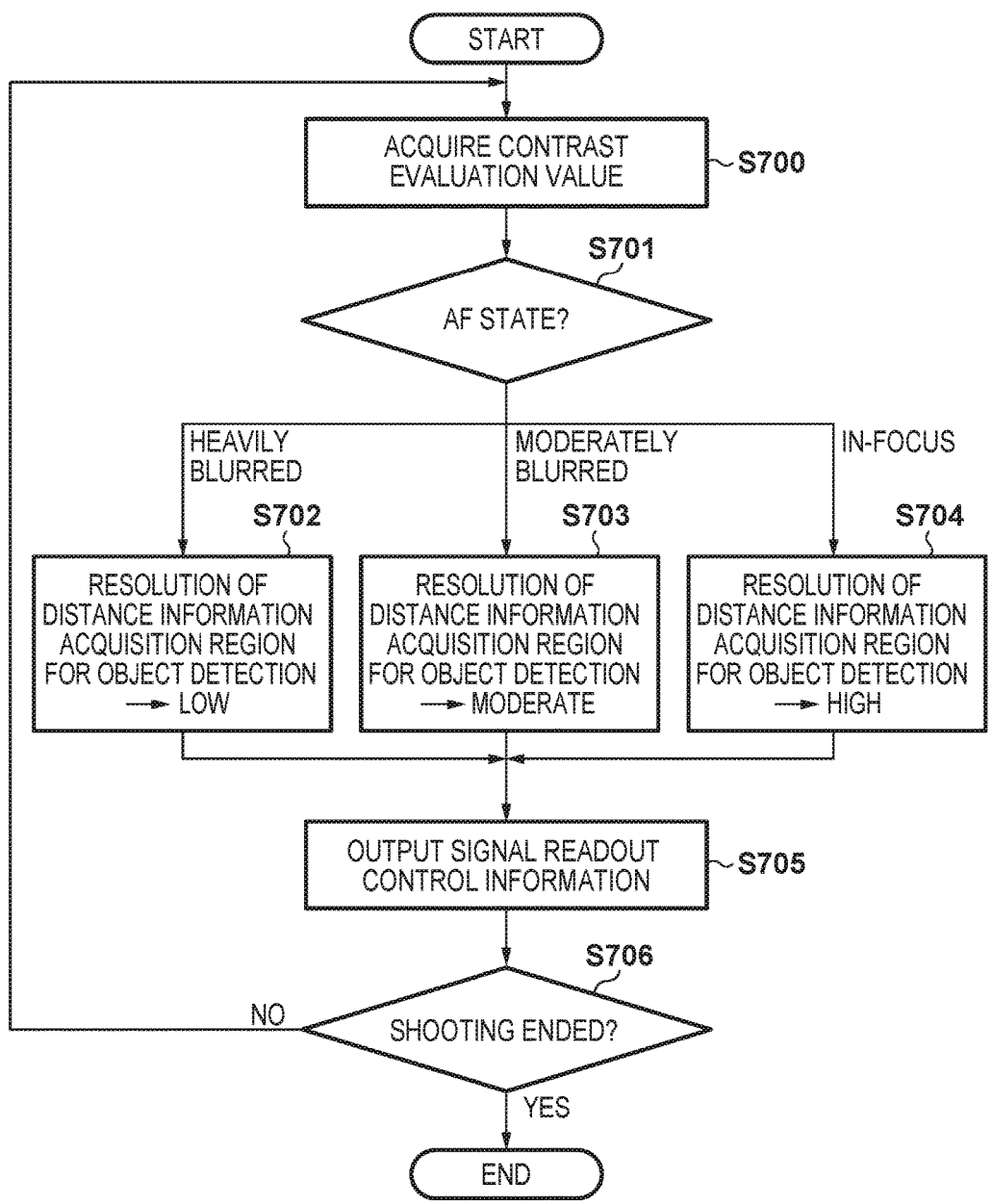

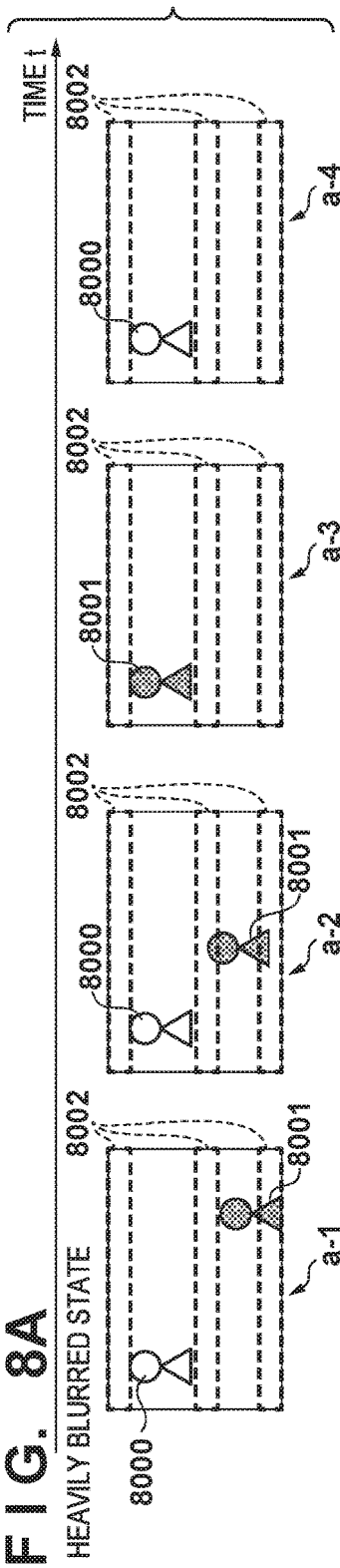
FIG. 8A HEAVILY BLURRED STATE
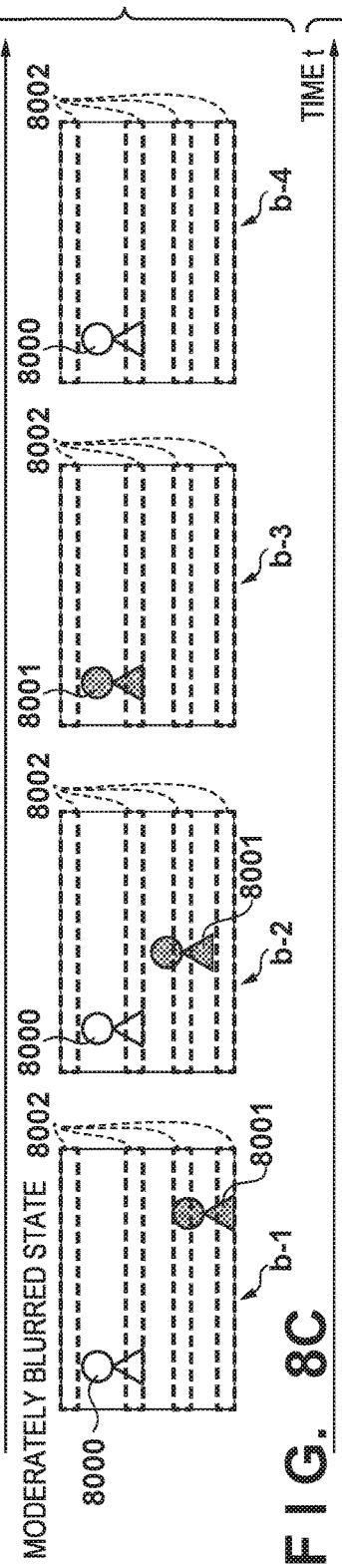
FIG. 8B MODERATELY BLURRED STATE
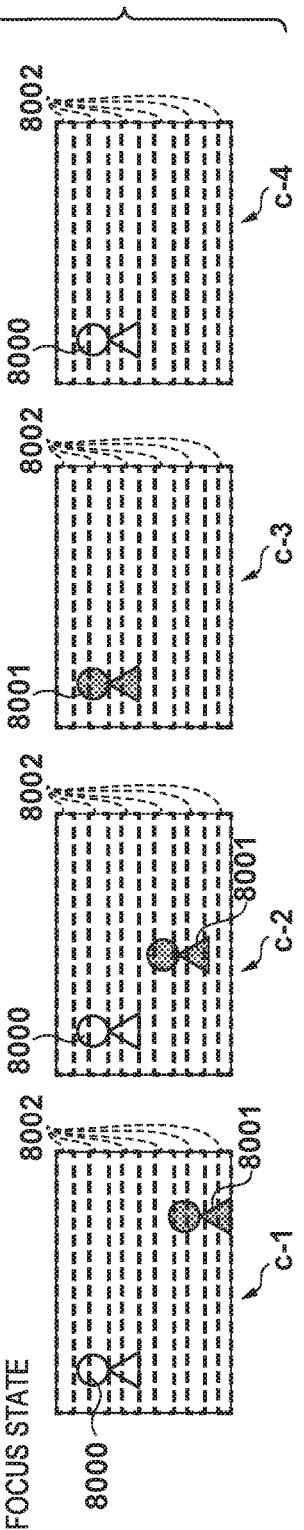
FIG. 8C IN-FOCUS STATE

IMAGE CAPTURING APPARATUS AND CONTROL METHOD THEREOF

BACKGROUND OF THE INVENTION

Field of the Invention

The present invention relates to an image capturing apparatus that performs focus adjustment and object detection.

Description of the Related Art

Conventionally, techniques for performing focus detection based on the phase difference of image signals acquired by an image sensor that has pupil-divided pixels using a microlens are known (Japanese Patent Laid-Open No. 2007-325139). In Japanese Patent Laid-Open No. 2007-325139, each pupil-divided pixel receives, via the microlens, light beams that have passed through different pupil regions of an imaging optical system. Also, image signals can be acquired by adding together image signals.

In focus detection by a phase difference method as described above, determining the amount of image signals that are to be read out for focus adjustment and subjected to calculation processing is a very important factor in terms of the detection accuracy and the processing speed. In addition, in the case of an image sensor in which each pixel is divided into two, if all the image signals are taken in, the data amount will be twice the data amount of data for a captured image, placing a large load on later-stage processing circuits.

In view of this, image capturing apparatuses have been proposed in which a distance information acquisition region for focus adjustment can be suitably set in the image sensor, and the time for reading out image signals from the image sensor is reduced (Japanese Patent Laid-Open No. 2012-155095). Also, image capturing apparatuses that can generate the distribution of the distances (a distance map) of objects in an image using image signals acquired from a distance information acquisition region for focus adjustment have been proposed (Japanese Patent Laid-Open No. 2014-074891). By using the distance map of Japanese Patent Laid-Open No. 2014-074891, distance information of a main object and another object in the image is acquired, and the main object can be detected in cases such as where the main object and the other object pass each other.

However, in the above-described conventional techniques, the distance information acquisition region for focus adjustment is changed according to the shooting condition, but the processing load and the electrical power consumption related to signals read out from the pixels are not taken into consideration.

SUMMARY OF THE INVENTION

The present invention has been made in consideration of the aforementioned problems, and realizes a technique that enables a distance information acquisition region to be set in consideration of the system load and the electrical power consumption related to signal processing that is based on a shooting condition.

In order to solve the aforementioned problems, the present invention provides an image capturing apparatus comprising: an image sensor; a readout unit configured to read out a signal from pixels of the image sensor; a setting unit configured to set a region in which a plurality of signals having different viewpoints are read out from each pixel of the image sensor by the readout unit; a first information acquisition unit configured to acquire first depth information for detecting an object using a signal read out from a first signal readout region set by the setting unit; an evaluation information acquisition unit configured to acquire evaluation information for detecting a focus state of an object using a signal read out by the readout unit; and a control unit configured to control a signal readout amount of the first signal readout region based on the focus state determined based on the evaluation information.

In order to solve the aforementioned problems, the present invention provides an image capturing apparatus comprising: an image sensor; a readout unit configured to read out a signal from pixels of the image sensor; a setting unit configured to set a region in which a plurality of signals having different viewpoints are read out from each pixel of the image sensor by the readout unit; a first information acquisition unit configured to acquire first depth information for detecting an object using a signal read out from a first signal readout region set by the setting unit; an evaluation information acquisition unit configured to acquire evaluation information for detecting a focus state of an object using a signal read out by the readout unit; and a control unit configured to control a signal readout amount of the first signal readout region based on the number of objects detected based on the first depth information.

In order to solve the aforementioned problems, the present invention provides a control method of an image capturing apparatus which has an image sensor, a readout unit configured to read out a signal from pixels of the image sensor, and a setting unit configured to set a region in which a plurality of signals having different viewpoints are read out from each pixel of the image sensor by the readout unit, the method comprising: acquiring first depth information for detecting an object using a signal read out from a first signal readout region set by the setting unit; acquiring evaluation information for detecting a focus state of an object using a signal read out by the readout unit; and controlling a signal readout amount of the first signal readout region based on the focus state determined based on the evaluation information.

In order to solve the aforementioned problems, the present invention provides a control method of an image capturing apparatus which has an image sensor, a readout unit configured to read out a signal from pixels of the image sensor, and a setting unit configured to set a region in which a plurality of signals having different viewpoints are read out from each pixel of the image sensor by the readout unit, the method comprising: acquiring first depth information for detecting an object using a signal read out from a first signal readout region set by the setting unit; acquiring evaluation information for detecting a focus state of an object using a signal read out by the readout unit; and controlling a signal readout amount of the first signal readout region based on the number of objects detected based on the first depth information.

In order to solve the aforementioned problems, the present invention provides a computer-readable storage medium storing a program for causing a computer to execute a control method of an image capturing apparatus which has an image sensor, a readout unit configured to read out a signal from pixels of the image sensor, and a setting unit configured to set a region in which a plurality of signals having different viewpoints are read out from each pixel of the image sensor by the readout unit, the method comprising: acquiring first depth information for detecting an object using a signal read out from a first signal readout region set by the setting unit; acquiring evaluation information for detecting a focus state of an object using a signal read out by the readout unit; and controlling a signal readout amount of the first signal readout region based on the focus state determined based on the evaluation information.

In order to solve the aforementioned problems, the present invention provides a computer-readable storage medium storing a program for causing a computer to execute a control method of an image capturing apparatus which has an image sensor, a readout unit configured to read out a signal from pixels of the image sensor, and a setting unit configured to set a region in which a plurality of signals having different viewpoints are read out from each pixel of the image sensor by the readout unit, the method comprising: acquiring first depth information for detecting an object using a signal read out from a first signal readout region set by the setting unit; acquiring evaluation information for detecting a focus state of an object using a signal read out by the readout unit; and controlling a signal readout amount of the first signal readout region based on the number of objects detected based on the first depth information.

According to the present invention, a distance information acquisition region can be set in consideration of the system load and the electrical power consumption related to signal processing that is based on a shooting condition.

Further features of the present invention will become apparent from the following description of exemplary embodiments (with reference to the attached drawings).

BRIEF DESCRIPTION OF THE DRAWINGS

FIG. 2 is a diagram schematically showing the pixel arrangement of an image sensor of the embodiments.

FIG. 5C is a diagram showing a focus detection frame that is set for the pixel array of the image sensor of the embodiments.

FIG. 7 is a flowchart showing processing for setting distance information acquisition regions performed by a signal readout control unit of a first embodiment.

FIGS. 8A to 8C are diagrams illustrating distance information acquisition regions set by the signal readout control unit of the first embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

Description of Distance Information Acquisition Region

First, distance information acquisition regions of embodiments of the present invention will be specifically described with reference to FIGS. 11A to 11C.

Figure 11A:
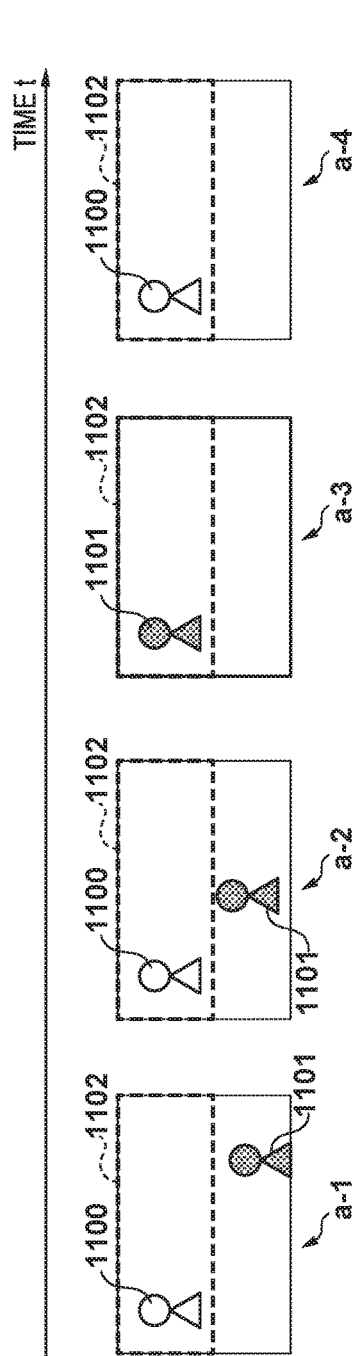
FIGS. 11A to 11D are diagrams illustrating distance information acquisition regions required for focus adjustment and object detection of the embodiments.
Figure 11B:
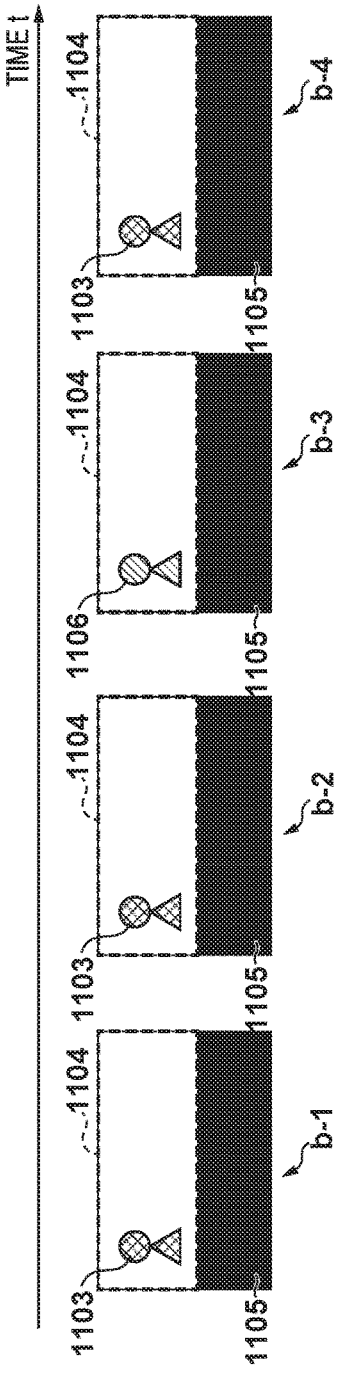
Figure 11C:
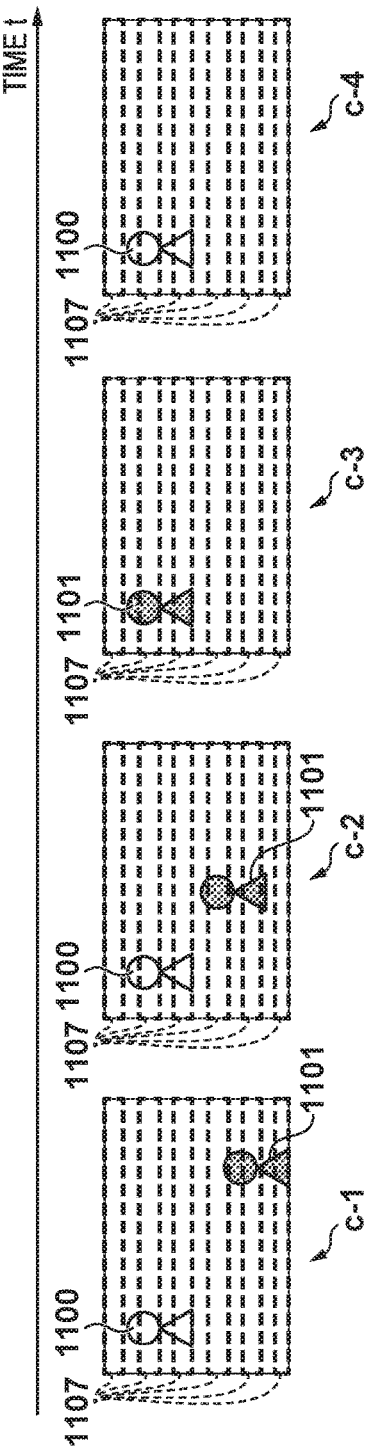

FIGS. 11A to 11C illustrate the relationship between a distance information acquisition region (for AF control) and a distance map thereof that are required for focus adjustment and distance information acquisition regions (for main object tracking) and a distance map thereof that are required for object detection, and those distance information acquisition regions and distance maps are suitably set on the imaging screen at the time of AF control during image shooting. Note that in FIGS. 11A to 11C, (a-1) to (a-4), (b-1) to (b-4), (c-1) to (c-4) and (d-1) to (d-4) indicate the frames of captured image signals in time series.

FIG. 11A illustrates image signals in the case where a distance information acquisition region for AF control is set on an imaging screen. In FIG. 11A, (a-1) indicates image signals and a distance information acquisition region for AF control at a certain time, reference numeral 1100 denotes a main object, reference numeral 1101 denotes an object other than the main object, and reference numeral 1102 denotes a distance information acquisition region. It suffices that distance information of the main object can be acquired for AF control, and thus it suffices for the distance information acquisition region that is set for AF control to encompass the main object. Therefore, the distance information acquisition region 1102 is locally set on the screen as in (a-1). In addition, as the time elapses as indicated by (a-1) to (a-4), the object 1101 other than the main object approaches the main object 1100 (a-2), the object 1101 other than the main object overlaps the main object 1100 (a-3), and then the object 1101 other than the main object disappears from the screen, and only the main object 1100 remains (a-4). In other words, the images (a-1) to (a-4) indicate a scene in which the main object and the other object pass each other.

In distance maps in FIG. 11B, a distance information acquisition region for AF control is set for the main object 1100. FIG. 11B illustrates distance maps acquired from the distance information acquisition regions 1102 in FIG. 11A. In FIG. 11B, (b-1) indicates a distance map acquired from the distance information acquisition region in (a-1), a cross-hatched region 1103 indicates the distance of the main object 1100, and a solid white portion 1104 indicates the distance of the background. Also, a solid black portion 1105 is a region outside of the distance information acquisition region, thus indicating that distance information cannot be acquired. Moreover, a hatched portion 1106 of (b-3) indicates the distance of the object 1101 other than the main object of (a-3).

Here, in the case of detecting the main object 1100 using the distance maps in FIG. 11B, only the distance 1103 of the main object 1100 is acquired in (b-1) and (b-2), and it appears as if the distance of the main object 1100 changed suddenly in (b-3). In actuality, the object 1101 other than the main object overlapped the main object 1100 and thus the distance changed, but there is a possibility that correct determination cannot be performed.

FIG. 11C illustrates image signals in the case where distance information acquisition regions for object detection are set on the imaging screen. In FIG. 11C, (c-1) indicates image signals and distance information acquisition regions for object detection at a certain time. The state of the surroundings of the main object needs to be determined in order to detect the main object 1100 using distance information. Therefore, a distance information acquisition region needs to be set such that the entire screen can be viewed. Therefore, distance information acquisition regions 1107 are discretely set over the entire screen as in (c-1). Note that the state where time elapses as in (c-1) to (c-4) and the state where the object 1101 other than the main object overlaps the main object 1100 in (c-3) are similar to (a-3) in FIG. 11A.

Figure 11D:
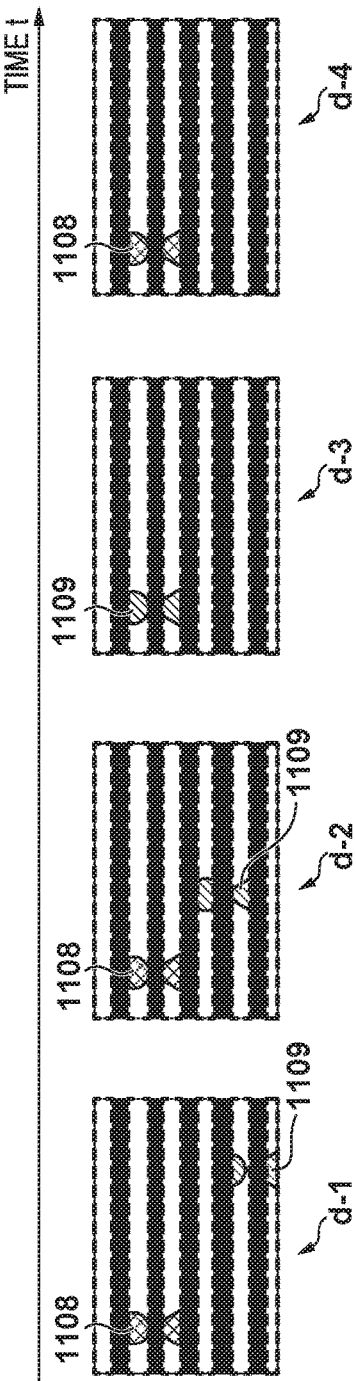

FIG. 11D illustrates a distance map acquired from the distance information acquisition regions 1107 in FIG. 11C. In FIG. 11D, the distance information acquisition regions 1107 are set such that the entire screen can be viewed, and thus it can be realized from the distance map that the object 1101 other than the main object approaches the main object 1100 as the time elapses from (d-1) to (d-2). In addition, in (d-3), the main object 1100 and the object 1101 other than the main object overlap each other, but since the object 1101 other than the main object approaches the main object 1100 from (d-1) to (d-2), and the object 1101 has a distance 1109 indicated by hatched lines, it can be determined that there is a high possibility that the main object 1100 and the object 1101 other than the main object overlap each other. On the other hand, a distance 1108 of the main object 1100 can only be acquired discretely, and thus accuracy of AF control deteriorates.

As described above, distance information acquisition regions for object detection need to be set such that the entire screen can be viewed.

However, the resolution of image signals acquired from distance information acquisition regions for object detection may be low depending on a shooting condition (e.g., the brightness of the object and the number of objects) in some cases. For example, the closer the AF state of the object is to the heavily blurred state (the smaller the contrast evaluation value is), the more useless a distance map acquired from distance information acquisition regions for object detection is, and thus in such a case, it is desirable to decrease the signal readout amount in the distance information acquisition regions for object detection in order to prioritize the signal readout speed and the power consumption, and to improve the convergence in AF control.

In view of this, in this embodiment, it is made possible to suppress the increase in load and useless electrical power consumption by controlling the signal readout amount of distance information acquisition regions for object detection based on the shooting condition at the time of AF control during image shooting. Note that the roughness/fineness of the distance information acquisition region for AF control is not changed.

First Embodiment

In this embodiment, an example will be described in which an image capturing apparatus is realized by a digital video camera that has an autofocus (AF) function by a contrast detection method and a phase difference detection method, and also an object detection function (a main object tracking function), but the present invention can be applied to electronic devices such as smart phones, which are one type of a mobile phone, and tablet terminals.

Apparatus Configuration

The configuration of an image capturing apparatus 100 of this embodiment will be described below with reference to FIG. 1.

Figure 1:
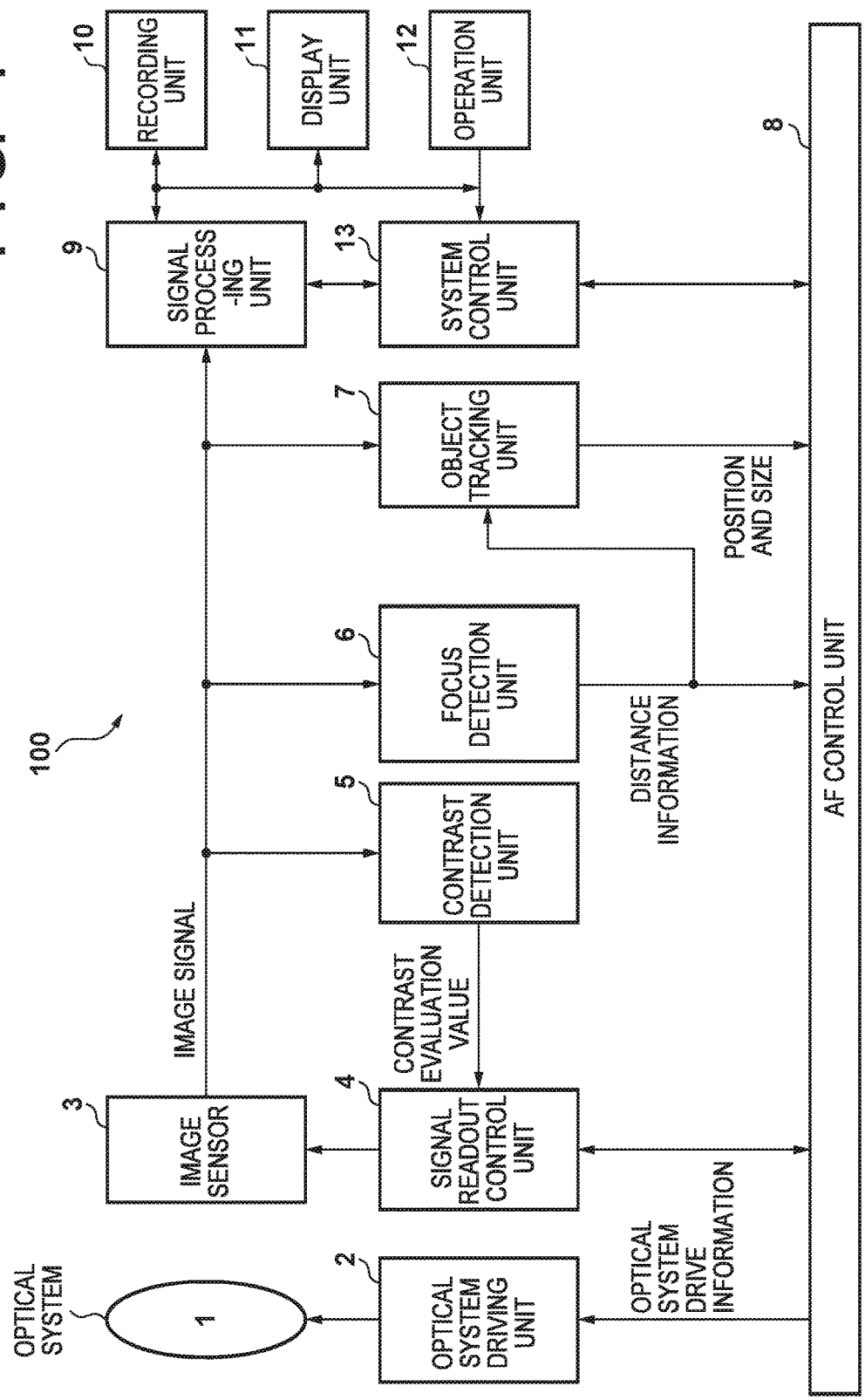
FIG. 1 is a block diagram showing the configuration of an image capturing apparatus of embodiments of the present invention.

In FIG. 1, an optical system 1 includes a zoom lens, a focus lens and a diaphragm. An optical system driving unit 2 controls the optical system 1 based on optical system drive information that is output from an AF control unit 8 to be described later. An image sensor 3 is provided with photoelectric conversion elements of a CMOS or the like, and converts an object image formed on a light receiving surface by the optical system 1 into electrical signals, and outputs image signals.

Under control of the AF control unit 8, a signal readout control unit 4 drives the image sensor 3 so as to control readout of image signals, based on a contrast evaluation value (evaluation information) from a contrast detection unit 5 serving as an evaluation information acquisition unit, which will be described later. Note that the image sensor 3 of this embodiment has a plurality of pixel portions that receive light beams that have passed through different pupil regions of the optical system 1 and output pupil-divided image signals. Image signals (an A image signal and a B image signal) having different parallax (or viewpoints) can be individually read out from each pupil-divided pixel by a drive pulse from the signal readout control unit 4. The circuit configuration of the image sensor 3 will be described later with reference to FIGS. 2 to 6C.

The contrast detection unit 5 calculates a contrast evaluation value based on image signals from the image sensor 3, and outputs the contrast evaluation value to the signal readout control unit 4.

A focus detection unit 6 calculates distance information for AF control (second depth information) and distance information for object detection within the screen (first depth information and distance map data) based on image signals (A image signals and B image signals) from the image sensor 3, and outputs the distance information for AF control and the distance information for object detection to an object tracking unit 7 and the AF control unit 8.

The object tracking unit 7 detects objects in a captured image based on the image signals from the image sensor 3 and phase difference information from the focus detection unit 6, identifies a main object among the detected objects, and outputs information regarding the position and the size of the main object (hereinafter, object information) to the AF control unit 8.

The AF control unit 8 performs contrast AF control or phase difference AF control under control of a system control unit 13. In the case of contrast AF, the AF control unit 8 outputs, to the optical system driving unit 2, a control signal that is based on the contrast evaluation value from the contrast detection unit 5. In the case of phase difference AF, the AF control unit 8 acquires object information from the object tracking unit 7 and distance information from the focus detection unit 6, and outputs a control signal to the optical system driving unit 2.

A signal processing unit 9 generates image signals acquired by adding together image signals from the image sensor 3, performs predetermined signal processing, and outputs image signals for display or for recording. The signal processing unit 9 also performs image processing such as color conversion, white balance correction and gamma correction, resolution conversion processing, image compression conversion and the like on the generated image signals, and outputs, to a recording unit 10 and a display unit 11, image signals for display or for recording.

The recording unit 10 is a memory card, a hard disk or the like in which the image signals generated by the signal processing unit 9 are recorded, and from which images that have been already recorded are read out. The display unit 11 is a liquid crystal panel (LCD) or the like that displays images generated by the signal processing unit 9, various menu screens and the like. An operation unit 12 is constituted by various switches (e.g., AF on/off and zoom) for receiving a user operation, and transmits instructions from the user to the system control unit 13.

The system control unit 13 includes a CPU, a RAM and a ROM for integrally controlling various functions of the image capturing apparatus 100, a dedicated circuit and the like. The CPU executes a control sequence, which will be described later, by loading, to the RAM serving as a work memory, a program stored in the ROM that is a non-volatile memory, and executing the program.

Configuration of Image Sensor

Figure 2:
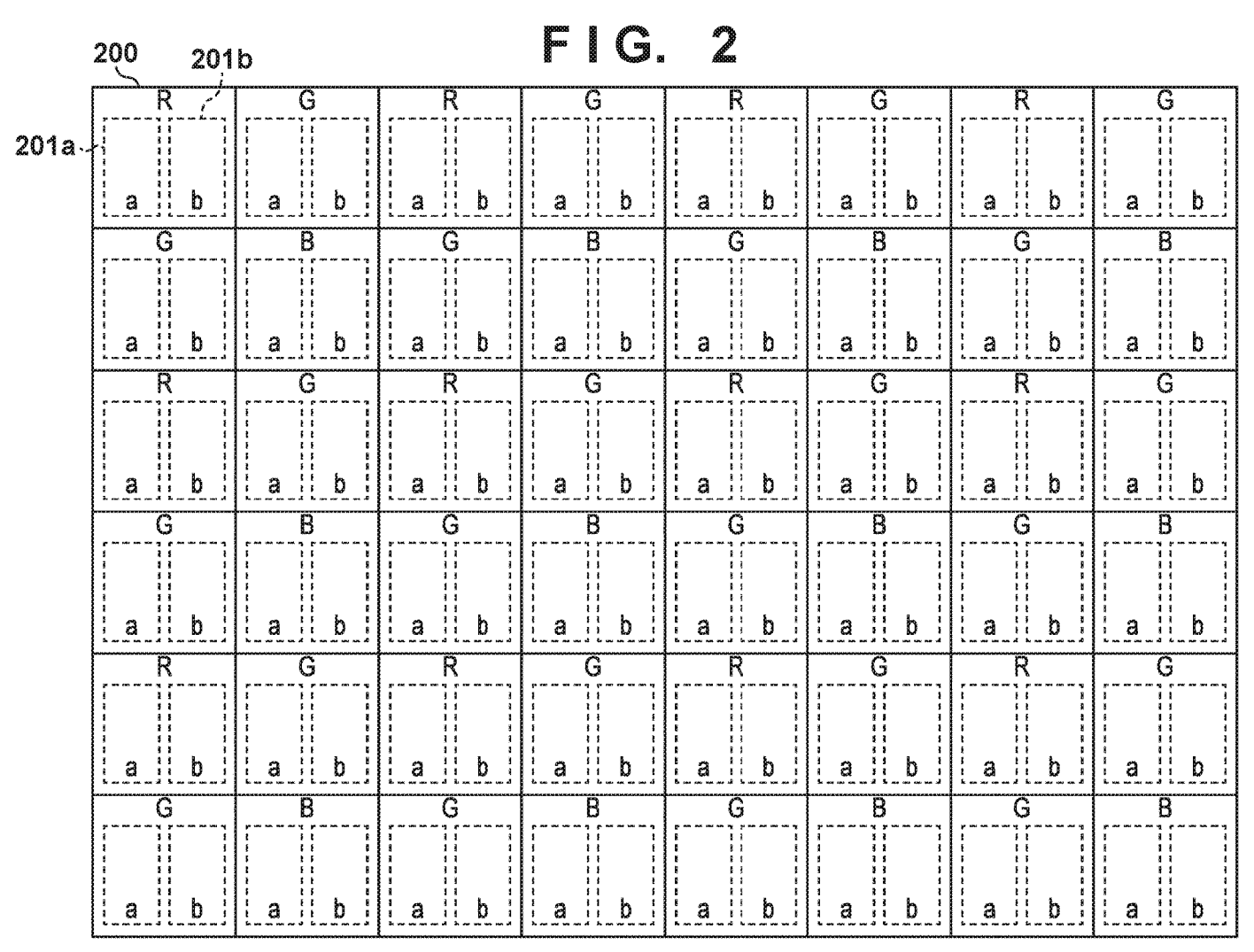

FIG. 2 is a schematic diagram showing the pixel arrangement of the image sensor 3. Unit pixels 200 are arranged in a matrix, and R (Red)/G (Green)/B (Blue) color filters are arranged on the unit pixels 200 in a Bayer pattern. In addition, subpixels a and b are arranged in each of the unit pixels 200, and photodiodes (hereinafter, PDs) 201a and 201b are respectively arranged in the subpixels a and b. Imaging signals that are output from the subpixels a and b are used for focus detection, and an a/b composite signal that is a signal acquired by adding the imaging signals output from the subpixel a and the subpixel b is used for image generation.

Figure 3:
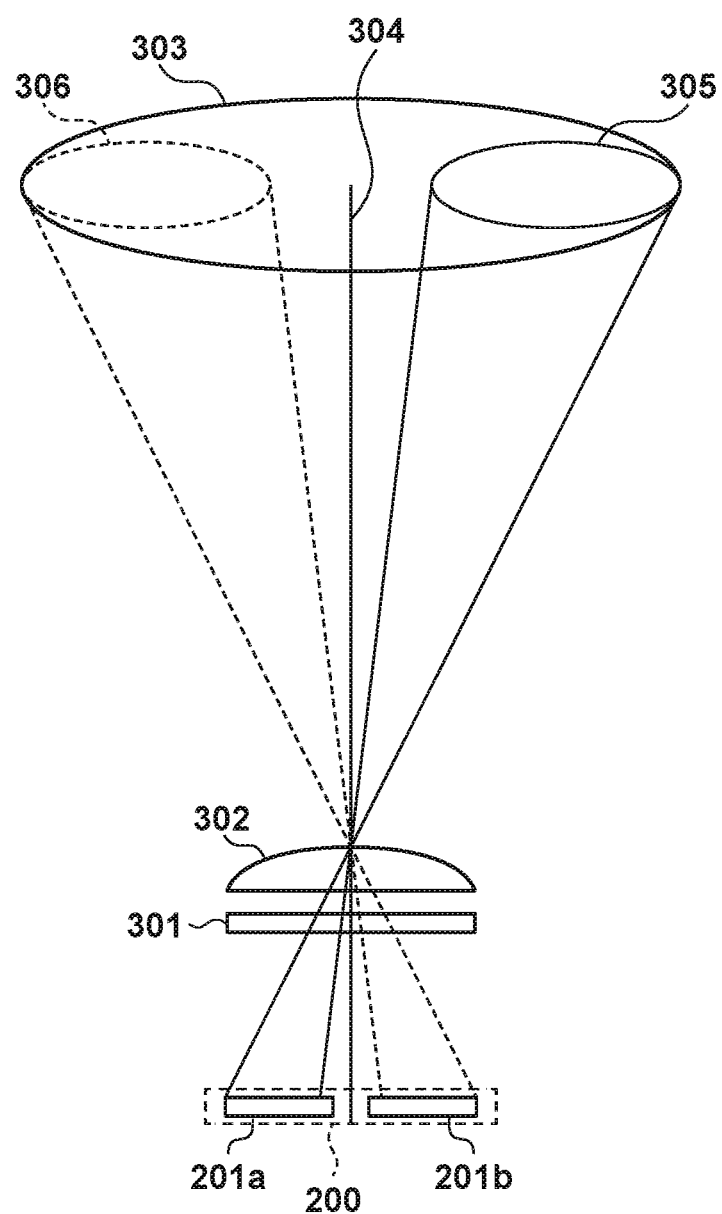
FIG. 3 is a diagram schematically showing the relationship between light beams coming from an exit pupil of a photographing lens and a pixel.

FIG. 3 shows the relationship between light beams coming from different regions of the exit pupil of the optical system 1 and the unit pixel 200, and the same reference numerals are assigned to constituent elements similar to those in FIG. 2.

As shown in FIG. 3, a color filter 301 and a microlens 302 are formed on each of the unit pixels 200. Specifically, the PDs 201a and 201b in the unit pixel 200 are assigned to one microlens 302. Light that has passed through an exit pupil 303 of the lens enters the unit pixel 200 centered on an optical axis 304. A light beam that passes through a pupil region 305, which is a region constituting a portion of the exit pupil 303, passes through the microlens 302, and is received by the subpixel a. On the other hand, a light beam that passes through a pupil region 306, which is a region constituting another portion of the exit pupil 303, passes through the microlens 302, and is received by the subpixel b. Therefore, the subpixels a and b respectively receive light from the separate pupil regions 305 and 306 of the exit pupil 303 of the optical system 1. Therefore, phase difference (imaging plane) focus detection is made possible by comparing an output signal of the subpixel a (A image signal) with an output signal of the subpixel b (B image signal) that have different parallax (or viewpoints) as described above.

Figure 4:
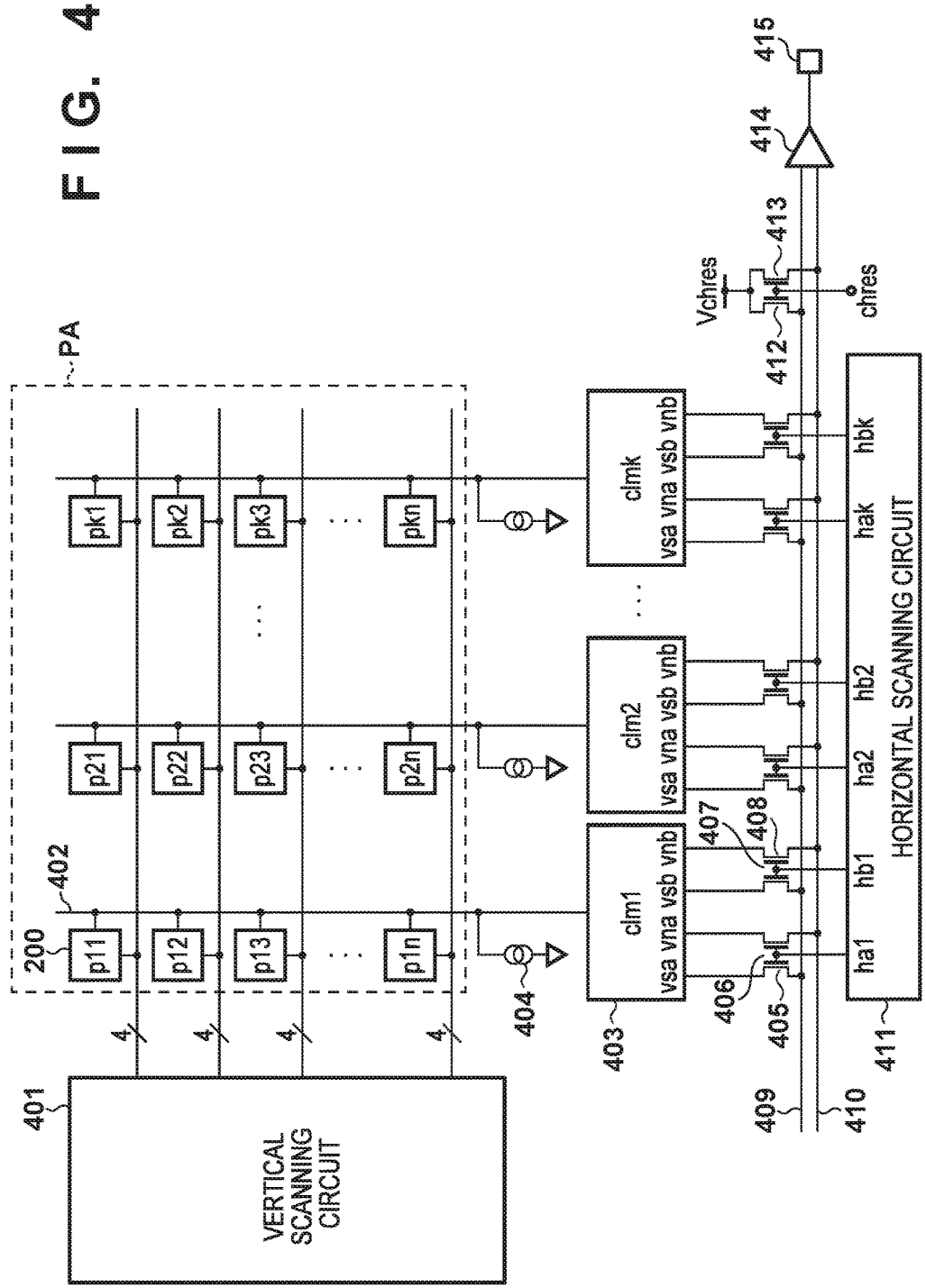
FIG. 4 is a configuration diagram of the image sensor of the embodiments.
Figure 5A:
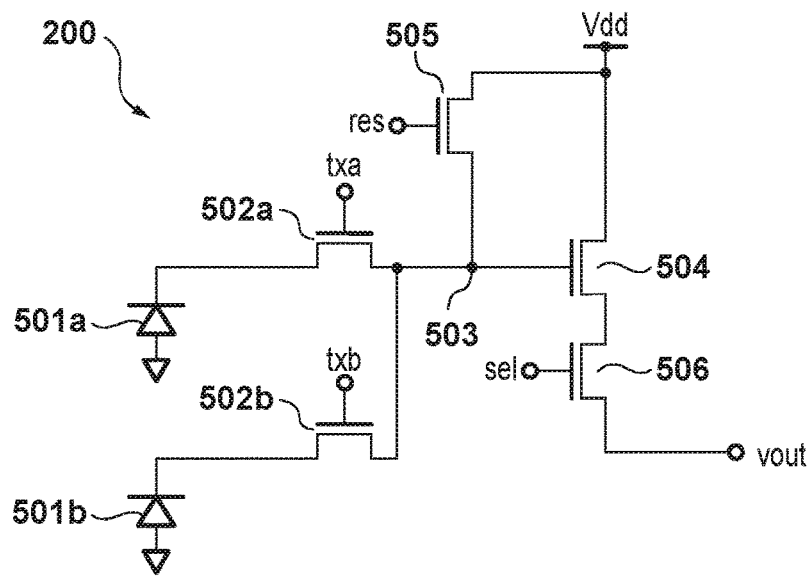
FIG. 5A is a diagram showing the circuit configuration of a unit pixel of the image sensor of the embodiments.

FIG. 4 shows the circuit configuration of the image sensor 3. In a pixel region PA, the unit pixels 200 are arranged in a matrix (n rows×k columns) as indicated by p11 to pkn. Here, the configuration of the unit pixel 200 will be described with reference to FIG. 5A. FIG. 5A is a diagram showing the circuit configuration of a unit pixel of the image sensor.

In FIG. 5A, optical signals that have entered PDs (photoelectric conversion portion) 501a and 501b of the above-described subpixels a and b undergo photoelectric conversion performed by the PDs 501a and 501b, and electric charges that correspond to an exposure amount are accumulated in the PDs 501a and 501b. The electric charges accumulated in the PDs 501a and 501b are transferred to an FD (floating diffusion) portion 503 (electric charge transfer) by raising signals txa and txb that are respectively applied to the gates of transfer gates 502a and 502b to the high level. The FD portion 503 is connected to the gate of a floating diffusion amplifier 504 (hereinafter, expressed as an FD amplifier), and the amount of electric charges transferred from the PDs 501a and 501b is converted into a voltage amount by the FD amplifier 504.

The FD portion 503 is reset by raising, to the high level, a signal res that is applied to the gate of an FD reset switch 505 for resetting the FD portion 503. In addition, in the case of resetting the electric charges of the PDs 501a and 501b, the signal res as well as the signals txa and txb are raised to the high level at the same time. This turns on both the transfer gates 502a and 502b and the FD reset switch 505, and the PDs 501a and 501b are reset via the FD portion 503. A pixel signal that has been converted into a voltage by the FD amplifier 504 is output to an output vout of the unit pixel 200 by raising a signal sel that is applied to the gate of a pixel selection switch 506 to the high level.

As shown in FIG. 4, a vertical scanning circuit 401 supplies, to each of the unit pixels 200, driving signals such as res, txa, txb and sel for controlling the above-described switches of the unit pixel 200. These driving signals res, txa, txb and sel are common to each row. The outputs vout of the unit pixels 200 are connected to a column common readout circuit 403 via a vertical output line 402 for each column.

Here, the configuration of the column common readout circuit 403 will be described with reference to FIG. 5B.

The vertical output line 402 is provided for each column of unit pixels 200, and is connected to the outputs vout of the unit pixels 200 for one column. A current source 404 is connected to the vertical output line 402, and a source follower circuit is constituted by the current source 404 and the FD amplifiers 504 of the unit pixels 200 connected to the vertical output line 402.

Figure 5B:
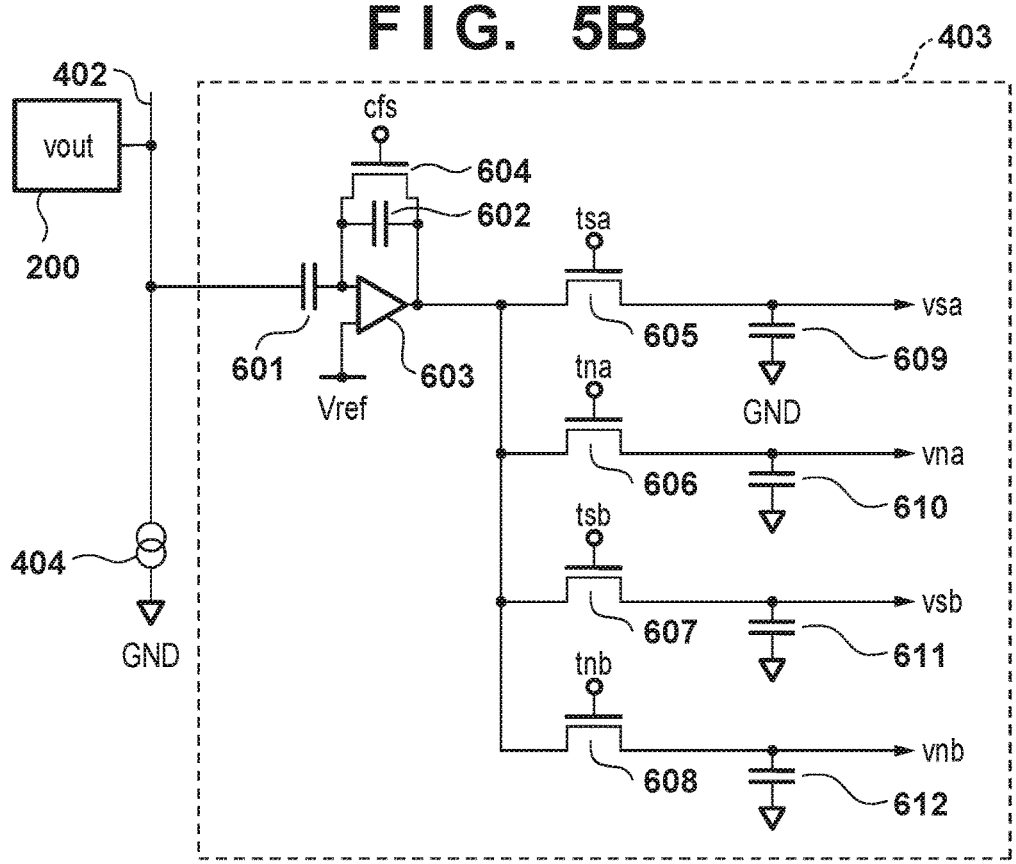
FIG. 5B is a configuration diagram of a readout circuit for a column of unit pixels of the image sensor of the embodiments.

In FIG. 5B, a clamp capacitor 601 has a capacity of C1, a feedback capacitor 602 has a capacity of C2, and an operational amplifier 603 has a non-inverted input terminal connected to a reference power supply Vref. A switch 604 is used for causing two ends of the feedback capacitor 602 to short-circuit, and the switch 604 is controlled by a signal cfs. Transfer switches 605 to 608 are used for respectively transferring, to signal storage capacitors 609 to 612, signals read out from the unit pixels 200. The first S signal storage capacitor 609 stores a pixel signal Sa that is output from the subpixel a by a readout operation to be described later. Also, the second S signal storage capacitor 611 stores an a/b composite signal Sab that is a signal acquired by compositing (adding) a signal output from the subpixel a and a signal output from the subpixel b. Moreover, the first N signal storage capacitor 610 and the second N signal storage capacitor 612 respectively store noise signals N of the unit pixels 200. The signal storage capacitors 609 to 612 are respectively connected to outputs vsa, vna, vsb and vnb of the column common readout circuit 403.

Horizontal transfer switches 405 and 406 are respectively connected to the outputs vsa and vna of the column common readout circuit 403. The horizontal transfer switches 405 and 406 are controlled by an output signal ha* (* is a column number) of a horizontal scanning circuit 411.

Also, horizontal transfer switches 407 and 408 are respectively connected to the outputs vsb and vnb of the column common readout circuit 403. The horizontal transfer switches 407 and 408 are controlled by an output signal hb* (* is a column number) of the horizontal scanning circuit 411. Horizontal output lines 409 and 410 are connected to an input of a differential amplifier 414, and the differential amplifier 414 takes the difference between an S signal and an N signal, applies a predetermined gain at the same time, and outputs a final output signal to an output terminal 415.

When a signal chres applied to the gates of horizontal output line reset switches 412 and 413 is raised to the high level, the horizontal output line reset switches 412 and 413 are turned on, and the horizontal output lines 409 and 410 are reset to a reset voltage Vchres.

An operation of reading out A image signals and an operation of reading out A+B image signals that are composite signals of the A image signals and B image signals will be described below.

FIG. 5C shows the relationship between distance information acquisition regions for focus adjustment and distance information acquisition regions for object detection that are set in the pixel region PA of the image sensor 3. Focus detection frames 620 are set by the focus detection unit 6, using region information from the AF control unit 8.

In the pixel region PA constituted by pixels of k columns×n rows, regions indicated by dotted lines are the focus detection frames 620. A image signals and A+B image signals are read out from unit pixel rows (pixel lines) included in distance information acquisition regions R1 indicated by hatched portions, and are used for image generation, focus detection and object detection. Only addition signals of A image signals and B image signals are read out from unit pixel rows (pixel lines) included in regions R2 other than the distance information acquisition regions R1, and are used only for image generation.

Note that as shown in FIG. 5C, if a plurality of regions R1 are set in the vertical direction of the pixel region, the number of rows of the unit pixels 200 may be set differently in each of the regions R1.

Figure 6A:
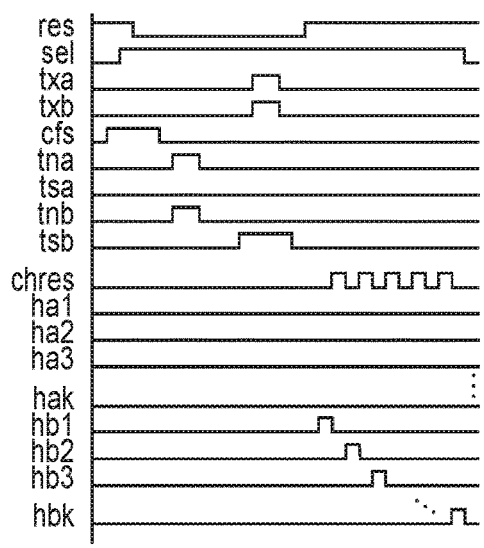
FIGS. 6A to 6C are timing charts of an operation of reading out a row of unit pixels of the image sensor of the embodiments.

Next, a readout operation of the image sensor 3 will be described with reference to FIG. 6A. FIG. 6A is a timing chart of the above-described readout operation performed on each row of the above-described regions R2.

First, the operational amplifier 603 is brought into a buffer state by raising the signal cfs to the high level and turning on the switch 604. Next, the signal sel is raised to the high level, and the pixel selection switch 506 of a unit pixel is turned on. After that, the signal res is lowered to the low level, and the FD reset switch 505 is turned off so as to release the resetting of the FD portion 503.

Subsequently, after the signal cfs is returned to the low level and the switch 604 is turned off, signals tna and tnb are raised to the high level, and noise signals N are stored in the first N signal storage capacitor 610 and the second N signal storage capacitor 612 via transfer switches 606 and 608.

Next, the signals tna and tnb are lowered to the low level, and the transfer switches 606 and 608 are turned off. After that, a transfer switch 607 is turned on by raising a signal tsb to the high level, and the transfer gates 502a and 502b are turned on by raising the signals txa and txb to the high level. By this operation, signals acquired by compositing electric charge signals accumulated in the PDs 501a of the subpixels a and electric charge signals accumulated in the PDs 501b of the subpixels b are output to the vertical output line 402 via the FD amplifier 504 and the pixel selection switch 506. Signals of the vertical output line 402 are amplified by the operational amplifier 603 using a gain that corresponds to the capacity ratio of the capacity C1 of the clamp capacitor 601 to the capacity C2 of the feedback capacitor 602, and are stored in the second S signal storage capacitor 611 via the transfer switch 607 (the a/b composite signal Sab). After sequentially turning off the transfer gates 502a and 502b and the transfer switch 607, the signal res is raised to the high level so as to turn on the FD reset switch 505, and the FD portion 503 is reset.

Next, the horizontal transfer switches 407 and 408 are turned on due to an output hb1 of the horizontal scanning circuit 411 rising to the high level. Accordingly, signals of the second S signal storage capacitor 611 and the second N signal storage capacitor 612 are output to the output terminal 415 via the horizontal output lines 409 and 410 and the differential amplifier 414. The horizontal scanning circuit 411 outputs the a/b composite signals (the A+B image signals) for one row by sequentially raising selection signals hb1, hb2, . . . , hbk of each column to the high level. Note that while signals of each column are read out by the signals hb1 to hbk, the horizontal output line reset switches 412 and 413 are turned on by raising the signal chres to the high level, and the horizontal output lines 409 and 410 are reset to the level of the reset voltage Vchres once.

The above-described operation is an operation of reading out each row of unit pixels in the region R2. The A+B image signals are read out by this operation.

Figure 6B:
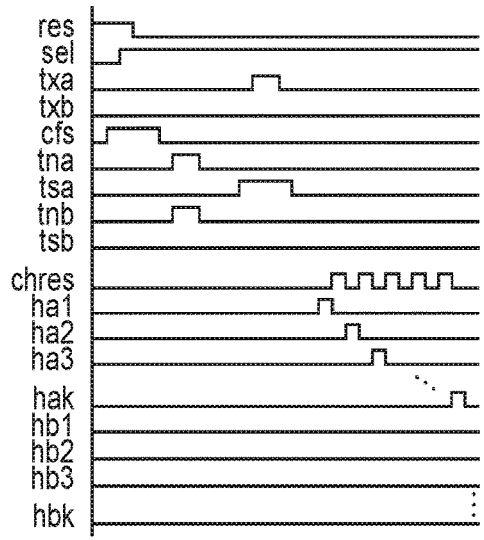
Figure 6C:
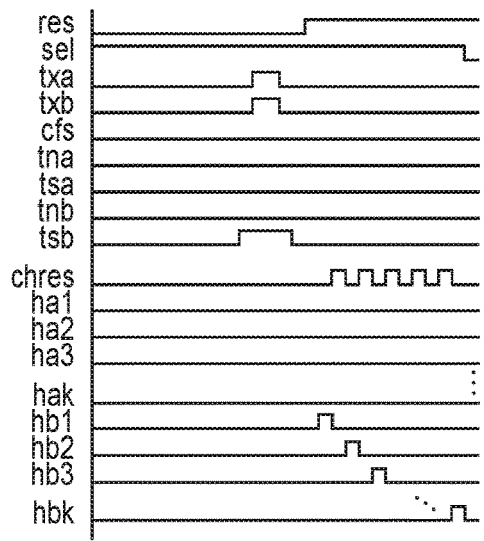

Subsequently, an operation of reading out each row of the regions R1 will be described with reference to FIGS. 6B and 6C. FIG. 6B is a timing chart of an operations for readout of the A image signals. The operation of first raising the signal cfs to the high level, lowering the signals tna and tnb to the low level, and storing N signals in the first N signal storage capacitor 610 and the second N signal storage capacitor 612 is similar to the operation described with reference to FIG. 6A.

When storing of the noise signals N ends, the transfer switch 605 is turned on by raising a signal tsa to the high level, and the transfer gate 502a is turned on by raising the signal txa to the high level. Signals accumulated in the PDs 501a of the subpixels a are output to the vertical output line 402 via the FD amplifier 504 and the pixel selection switch 506 by performing such an operation. Signals of the vertical output line 402 are amplified by the operational amplifier 603 using a gain that corresponds to the capacity ratio of the capacity C1 of the clamp capacitor 601 to the capacity C2 of the feedback capacitor 602, and are stored in the first S signal storage capacitor 609 via the transfer switch 605 (the pixel signal Sa).

Next, the horizontal transfer switches 405 and 406 are turned on due to an output ha1 of the horizontal scanning circuit 411 rising to the high level. Accordingly, signals of the first S signal storage capacitor 609 and the first N signal storage capacitor 610 are output to the output terminal 415 via the horizontal output lines 409 and 410 and the differential amplifier 414. The horizontal scanning circuit 411 outputs the signals of the subpixels a (the A image signals) for one row by sequentially raising selection signals ha1, ha2, . . . , hak for each column to the high level.

Readout of the A image signals ends while the signal res remains at the low level, and the signal sel remains at the high level. Accordingly, the A image signals on the FD portions 503 are held without being reset.

When readout of the A image signals ends, the procedure subsequently transitions to an operation of reading out the A+B image signals shown in FIG. 6C. The transfer switch 607 is turned on by raising the signal tsb to the high level, and the transfer gates 502a and 502b are turned on by raising the signals txa and txb to the high level. Due to such an operation, signals accumulated in the PDs 501b of the subpixels b are added to the signals of the subpixels a stored in the FD portion 503, and the added signals are output to the vertical output line 402 via the FD amplifier 504 and the pixel selection switch 506. The rest of the operation is the same as the operation regarding the region R2 described with reference to FIG. 6A.

In such a manner, an operation of reading out each row in the regions R1 ends. Accordingly, in the region R1, readout of the A image signals and readout of the A+B image signals are performed, and the A image signals and the A+B image signals are sequentially read out.

Shooting Operation

Next, an operation during image shooting performed by the image capturing apparatus 100 that has the above-described configuration will be described.

First, the optical system 1 uses a driving signal from the optical system driving unit 2 to drive the diaphragm and the lens, so as to form an object image whose brightness is set to be appropriate, on the light receiving surface of the image sensor 3. The image sensor 3 is driven by a drive pulse from the signal readout control unit 4, converts the object image into electrical signals by photoelectric conversion, and outputs the electrical signals as image signals.

Using a drive pulse that corresponds to a contrast AF evaluation value from the contrast detection unit 5, the signal readout control unit 4 reads out the A image signals and reads out the A+B image signals from the region R1, and reads out the A+B image signals from the region R2 by the above-described readout operation. The processing load is reduced by reading out the A image signals from a portion of the region in this manner. Furthermore, in the region R1 from which the A image signals have been read out, the AF control unit 8 acquires B image signals by subtracting the A image signals from the A+B image signals, and performs AF control using the A image signals and the B image signals. Note that AF control may be performed by individually reading out the A image signals and the B image signals from the region R1, and reading out the A+B image signals from the region R2 other than the region R1.

The contrast detection unit 5 calculates a contrast evaluation value in a focus detection frame based on the image signals from the image sensor 3, and outputs the contrast evaluation value to the signal readout control unit 4. In this case, the contrast detection unit 5 adds together the A image signals and the B image signals, applies the same format as the A+B image signals read out from the region R2 other than the distance information acquisition region R1, and then calculates the contrast evaluation value.

Here, an overview of contrast AF will be described. The contrast AF evaluation value calculation unit 5 shifts a first focus detection signal acquired from the A image signal and a second focus detection signal acquired from the B image signal relatively in the pupil division direction, adds those signals to generate a shift addition signal, and calculates a contrast evaluation value from the generated shift addition signal.

Letting a k-th first focus detection signal be A(k), a k-th second focus detection signal be B(k), the range of the number k for the distance information acquisition region R1 be W, the shift amount due to shift processing be s1, and the shift range of the shift amount s1 be τ1, a contrast evaluation value RFCON is calculated using the following expression.

$$RFCON(s1) = \max_{k \in W} |A(k) - B(k - s1)|, s1 \in \tau1$$

Due to shift processing by the shift amount s, the k-th first focus detection signal A (k) and a (k−s1)th second focus detection signal B (k−s1) are added in association with each other so as to generate a shift addition signal, and the contrast evaluation value RFCON (s1) is calculated from the shift addition signal.

The focus detection unit 6 calculates distance information (first depth information and second depth information) of the object with use of image signals read out from the distance information acquisition region for AF control and the distance information acquisition regions for object detection that are controlled by the signal readout control unit 4, and B image signals acquired by subtracting the A image signals from A+B image signals. Note that in this embodiment, the distance information is phase difference information (a defocus amount) for performing phase difference (imaging plane) AF.

Here, an overview of phase difference AF will be described. The focus detection unit 6 shifts a first focus detection signal acquired from the A image signal and a second focus detection signal acquired from the B image signal relatively in the pupil division direction, and calculates a correlation amount indicating a signal matching degree. Letting a k-th first focus detection signal be A(k), a k-th second focus detection signal be B(k), the range of the number k for the distance information acquisition region R1 be W, the shift amount due to shift processing be s2, and the shift range of the shift amount s2 be τ2, a correlation amount COR is calculated using the following expression.

$$COR(s2) = \sum_{k \in W} |A(k) - B(k - s2)|, s2 \in \tau2$$

Due to shift processing by the shift amount s2, the k-th first focus detection signal A (k) and a (k−s2)th second focus detection signal B (k−s2) are associated with each other, and subtraction is performed to generate a shift subtraction signal, and the sum of the k signals is obtained within the range W corresponding to the distance information acquisition region so as to calculate the correlation amount COR (s2). After that, the shift amount of a real value at which the correlation amount is a minimum value is calculated from the correlation amount by performing subpixel calculation, and is denoted by an image shift amount p1. The image shift amount p1 is multiplied by the image height of the focus detection region, the F-number of the imaging lens (imaging optical system) and a first conversion coefficient K1 that corresponds to the exit pupil distance so as to detect the defocus amount.

Note that in this embodiment, an example is described in which the focus detection unit 6 calculates distance information from A image signals and B image signals having different parallax (or viewpoints), but "information corresponding to depth" that is not converted into "distance" may be used as information for object detection, for example. The "information corresponding to depth" may be in any form of information regarding a "parallax amount (an image shift amount)" of A image signals and B image signals generated in the process of conversion into "distance", information regarding a "defocus amount", and information regarding "object distance", for example. In addition, in this embodiment, the "object distance" among the "information corresponding to depth" is acquired in a state of being dispersed over the entire screen, as information for object detection.

Note that the "information corresponding to depth" for object detection may be recorded in association with the image.

The present invention can be applied to various embodiments as information corresponding to the depths of the objects in an image. Accordingly, it suffices for information (depth information) indicated by data corresponding to the depths of the objects to be information directly indicating the object distances in the image from the image capturing apparatus to the object or information indicating the relative relationship between the object distances and the depths of the object in the image.

Specifically, the image sensor 3 can output images formed as optical images by a pair of light beams that pass through different pupil regions of the optical system 1, as paired image signals, from a plurality of photoelectric conversion portions. An image shift amount of each region is calculated by correlation calculation between the paired image signals, and an image shift map indicating the distribution of the image shift amounts is calculated. Alternately, the image shift amount is further converted into a defocus amount, and a defocus map indicating defocus amount distribution (distribution on the two dimensional planes of the captured image) is generated. If this defocus amount is converted into an object distance based on the conditions of the optical system 1 or the image sensor 3, distance map data that indicates an object distance distribution is acquired.

As described above, in this embodiment, it suffices for the focus detection unit 6 to acquire image shift map data, defocus map data, or distance map data of object distances converted from a defocus amount. Note that data of each map data may be held in units of blocks, or in units of pixels. In this case, about eight bits as the number of bits are assigned in the smallest unit as in normal image data, and image processing, displaying, recording and the like may be performed using the data as distance image, similarly to image processing.

The object tracking unit 7 detects objects based on image signals from the image sensor 3 and distance information from the AF control unit 8, specifies a main object from the detected objects, and outputs object information regarding the position and the size of the main object to the AF control unit 8. If the object tracking unit 7 tracks the face of a specific person as the main object (main face), a face at a position closer to the center of the screen is set as the main face, and the destination of the main face is detected from the movement vector, color and size of the main face. The object tracking unit 7 then tracks the main face based on distance information of the main face and distance information of an object around the main face, and determines the main face in cases such as where another object and the main face pass each other.

In addition, in the case of performing contrast AF, the AF control unit 8 detects an in-focus position (a peak position at which the contrast evaluation value is largest) based on a contrast evaluation value from the contrast AF evaluation value calculation unit 5, and outputs, to the optical system driving unit 2, optical system driving information for bringing the main object into the in-focus state. Also, in the case of performing phase difference AF, the AF control unit 8 detects an in-focus position based on distance information (corresponding to an image shift amount or a defocus amount at which the correlation amount is smallest) from the focus detection unit 6, and outputs, to the optical system driving unit 2, optical system driving information for bringing the main object into the in-focus state. Note that the AF control unit 8 may perform control so as to bring the main object closer to the in-focus state (using distance information from the focus detection unit 6) by performing phase difference AF, and to bring the main object into the in-focus state (using contrast evaluation value) by further performing contrast AF. In other words, the AF control unit 8 may perform control so as to bring the main object into the in-focus state using at least one of the contrast evaluation value from the contrast AF evaluation value calculation unit 5 and the distance information from the focus detection unit 6.

The signal processing unit 9 generates image data by converting image signals from the image sensor 3 into luminance signals and color difference signals, and outputs the image data to the recording unit 10 and the display unit 11. The recording unit 10 and the display unit 11 record and display the image data generated by the signal processing unit 9.

Operations of AF Control Unit and Signal Readout Control Unit

Next, processing for setting distance information acquisition regions for object detection in the case where the signal readout control unit 4 drives the image sensor 3 at the time of AF control in a shooting operation under control of the AF control unit 8 so as to read out image signals will be described with reference to FIG. 7.

In step S700, the signal readout control unit 4 acquires a contrast evaluation value from the contrast detection unit 5.

In step S701, the signal readout control unit 4 determines the AF state based on the contrast evaluation value acquired in step S700. The signal readout control unit 4 uses thresholds Th1 and Th2 (Th1<Th2) to determine that the AF state is a heavily blurred state if the contrast evaluation value is smaller than the threshold Th1, determine that the AF state is a moderately blurred state if the contrast evaluation value is greater than the threshold Th1 and smaller than the threshold Th2, and determine that the AF state is an in-focus state if the contrast evaluation value is greater than the threshold Th2. The procedure then advances to step S702 if it is determined that the AF state is the heavily blurred state, the procedure advances to step S703 if it is determined that the AF state is the moderately blurred state, and the procedure advances to step S703 if it is determined that the AF state is the in-focus state.

Here, as described above, distance information acquisition regions for object detection (main object tracking) need to be set such that the entire screen can be viewed, but the signal readout amount does not need to always be constant. Therefore, in the object tracking unit 7, distance information for object detection is not required if the contrast evaluation value is too small to identify a main object. In view of this, in this embodiment, according to the AF state determined based on the contrast evaluation value, the closer the AF state is to the heavily blurred state, the lower the resolution of the distance information acquisition regions for object detection is set so as to decrease the signal readout amount, and thereby the reduction in system load and electrical power consumption that are related to signal processing for object detection (main object tracking) is prioritized. In the case of the moderately blurred state in which the main object starts to be identifiable, object detection gradually becomes necessary, and thus the resolution of the distance information acquisition regions for object detection is set moderate so as to achieve balance between the signal readout amount and the reduction in system load and electrical power consumption. In the case of the AF state in which object detection is possible, the resolution of the distance information acquisition regions for object detection is set high, such that the distance information of an object other than a main object can be acquired.

Here, processing for controlling the resolution of the distance information acquisition regions for object detection in steps S702 to S704 in FIG. 7 will be described in detail with reference to FIGS. 8A to 8C. Note that in FIGS. 8A to 8C, (a-1) to (a-4), (b-1) to (b-4) and (c-1) to (c-4) indicate frames of captured image signals in time series. In addition, in FIGS. 8A to 8C, reference numeral 800 denotes a main object, reference numeral 801 denotes an object other than the main object, and reference numeral 802 denotes a distance information acquisition region for object detection. FIG. 8A illustrates an example of region setting in the heavily blurred state (step S702), FIG. 8B illustrates an example of region setting in the moderately blurred state (step S703), and FIG. 8C illustrates an example of region setting in the in-focus state (step S704).

In the case of the heavily blurred state in step S702, the signal readout control unit 4 performs region setting such that the resolution of the distance information acquisition regions for object detection 802 is low as in FIG. 8A. In this case, the distance information acquisition regions for object detection 802 on the screen are in the roughest state, and the signal readout amount is smallest.

In the case of the moderately blurred state in step S703, the signal readout control unit 4 performs region setting such that the resolution of the distance information acquisition regions for object detection 802 is moderate as in FIG. 8B. In this case, the distance information acquisition regions for object detection 802 on the screen are in an intermediate state between being rough and being fine, and the signal readout amount is larger. In this manner, in the moderately blurred state in FIG. 8B, the distance information of the object other than the main object can also be acquired from the distance information acquisition regions for object detection 802, in contrast with the heavily blurred state in FIG. 8A.

The AF state in step S704 is the in-focus state, and thus the signal readout control unit 4 performs region setting such that the resolution of the distance information acquisition regions for object detection is high as in FIG. 8C. In this case, the distance information acquisition regions for object detection 802 in the screen are in the finest state, and the signal readout amount is largest. In the in-focus state in FIG. 8C, the distance information of the object other than the main object can be acquired from the distance information acquisition regions for object detection 802 at a higher resolution than in the moderately blurred state in FIG. 8B.

In step S705, the signal readout control unit 4 calculates control information that is based on the resolution of the distance information acquisition regions set in steps S702 to S704, and outputs a drive pulse to the image sensor 3.

In step S706, the signal readout control unit 4 determines whether or not the shooting operation has ended, using an instruction from the AF control unit 8 to end the shooting or the like as a trigger, and repeats the processing from step S700 until it is determined that the shooting operation has ended.

According to this embodiment, it is possible to suppress the system load and the electrical power consumption related to signal processing by controlling the roughness/fineness of distance information acquisition regions for object detection based on a contrast evaluation value at the time of AF control during image shooting.

Second Embodiment

Next, a second embodiment will be described.

In the first embodiment, the signal readout control unit 4 controls the resolution of distance information acquisition regions for object detection based on the contrast evaluation value from the contrast detection unit 5. In contrast, in the second embodiment, a signal readout control unit 4 controls the resolution of distance information acquisition regions for object detection based on the number of objects from an object tracking unit 7.

Note that in the second embodiment, the same reference numerals are assigned to constituent elements similar to those in the first embodiment, and description thereof is omitted.

Figure 9:
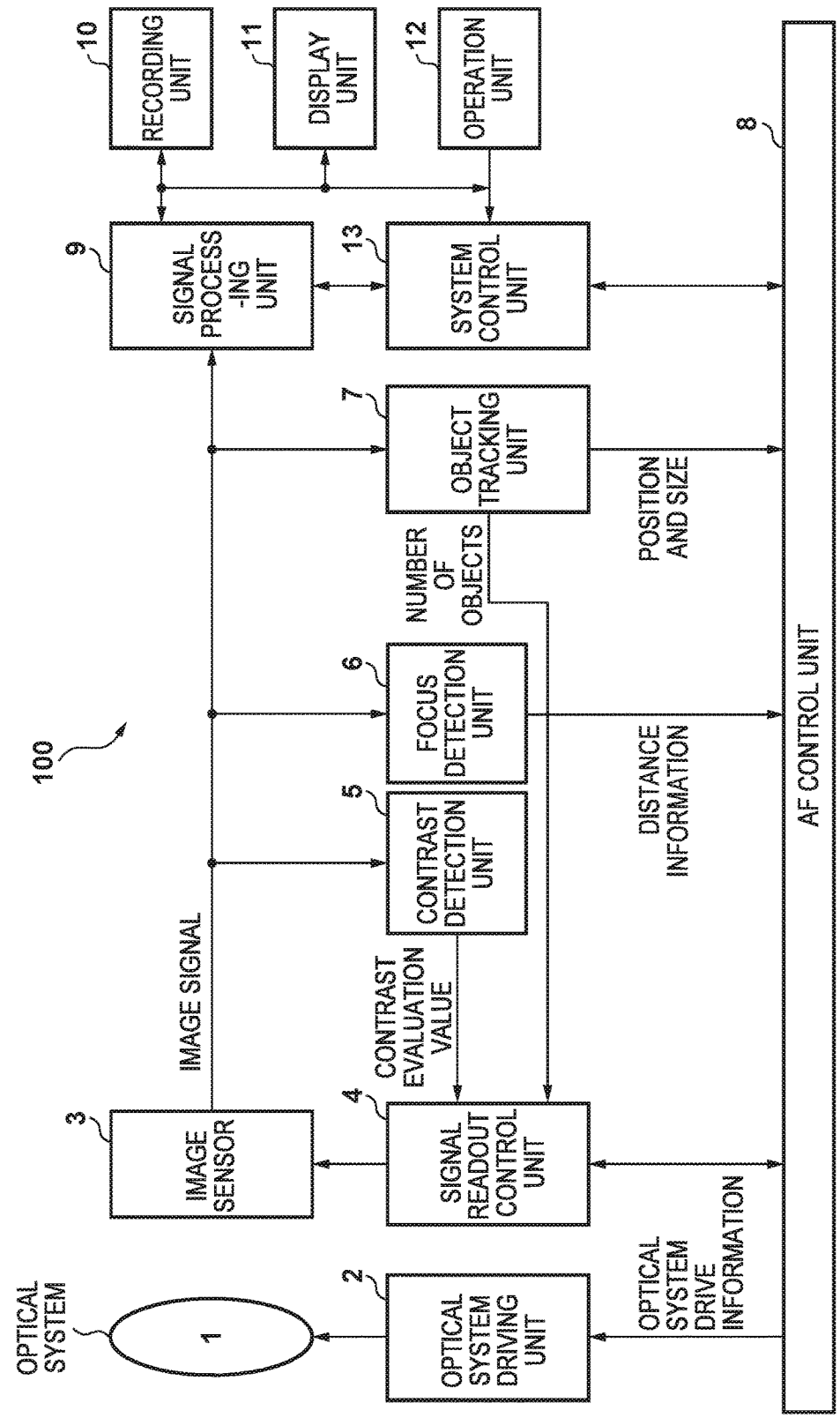
FIG. 9 is a block diagram showing the configuration of an image capturing apparatus of the second embodiment.

FIG. 9 shows the configuration of an image capturing apparatus 100 of the second embodiment, and differences from the first embodiment are that the object tracking unit 7 detects the number of objects in a captured image based on image signals from an image sensor 3 and distance information from a focus detection unit 6, and outputs the number of objects to the signal readout control unit 4, and that the signal readout control unit 4 controls the resolution of distance information acquisition regions for object detection based on the number of objects from the object tracking unit 7.

Figure 10:
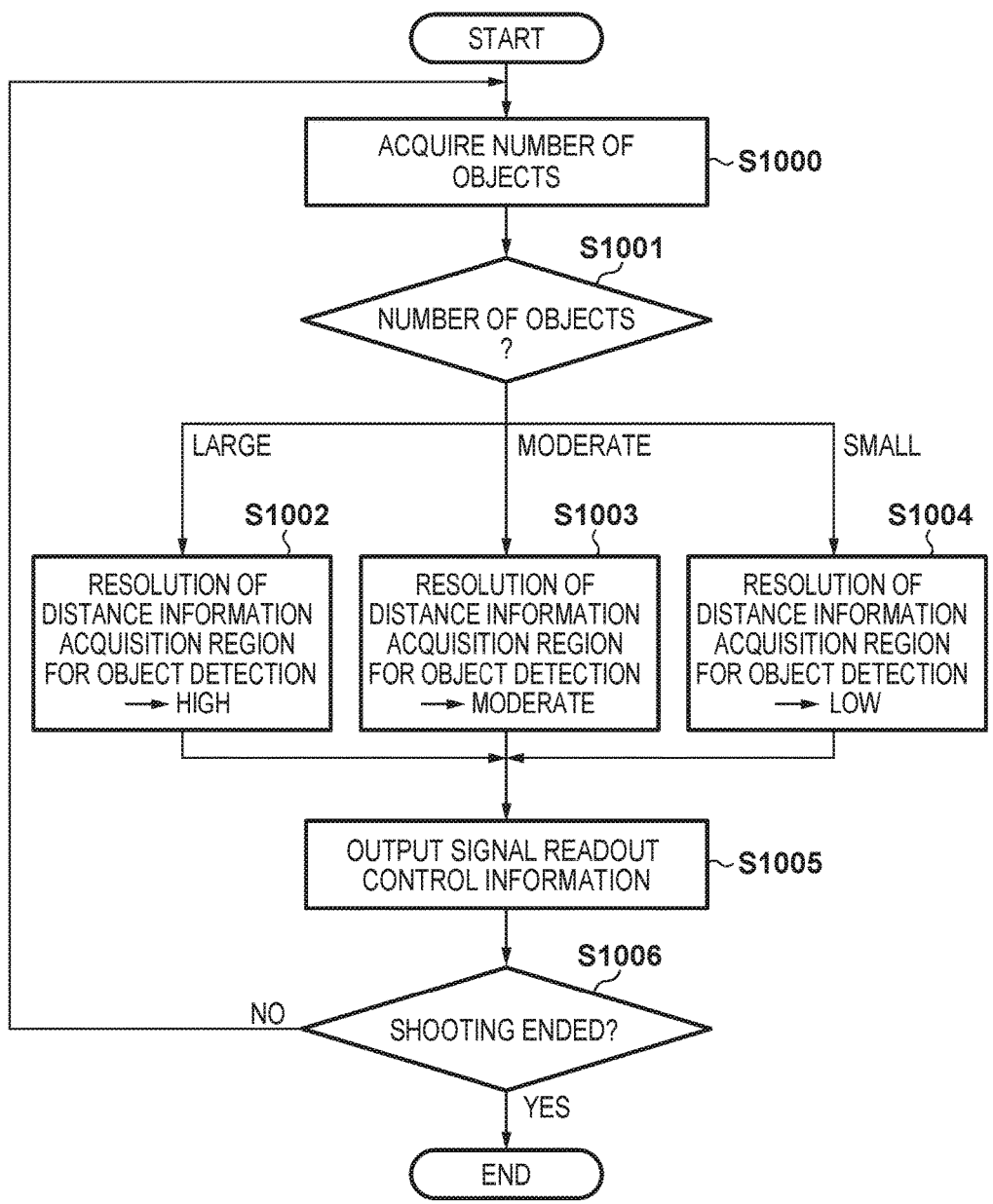
FIG. 10 is a flowchart showing processing for setting distance information acquisition regions performed by a signal readout control unit of a second embodiment.

Next, processing for setting distance information acquisition regions for object detection in the case where the signal readout control unit 4 drives the image sensor 3 under control of an AF control unit 8 at the time of AF control in a shooting operation so as to read out image signals will be described with reference to FIG. 10.

In step S1000, the signal readout control unit 4 acquires the number of objects from the object tracking unit 7.

In step S1001, the signal readout control unit 4 determines whether the number of objects acquired in step S1000 is large, small or moderate. The signal readout control unit 4 uses thresholds Th3 and Th4 (Th3<Th4) to determine that the number of objects is small if the number of objects is smaller than the threshold Th3, determine that the number of objects is moderate if the number of objects is greater than the threshold Th3 and smaller than the threshold Th4, and determine that the number of objects is large if the number of objects is greater than the threshold Th4. The procedure then advances to step S1002 if it is determined that the number of objects is small, the procedure advances to step S1003 if it is determined that the number of objects is moderate, and the procedure advances to step S1004 if it is determined that the number of objects is large.

In this embodiment, the number of objects serves as a determination condition because the larger the number of objects is, the higher the possibility that an object other than a main object passes in front of the main object is, and thus the possibility that determination of the main object using distance information is required becomes high.

In step S1002, if the number of objects is large, the signal readout control unit 4 performs region setting such that the resolution of distance information acquisition regions for object detection is high similarly to FIG. 8C.

In step S1003, if the number of objects is moderate, the signal readout control unit 4 performs region setting such that the resolution of the distance information acquisition regions for object detection 802 is moderate similarly to FIG. 8B.

In step S1004, if the number of objects is small, the signal readout control unit 4 performs region setting such that the resolution of the distance information acquisition regions for object detection 802 is low similarly to FIG. 8A.

In step S1005, the signal readout control unit 4 calculates control information that is based on the resolution of the distance information acquisition regions set in steps S1002 to S1004, and outputs a drive pulse to the image sensor 3.

In step S1006, the signal readout control unit 4 determines whether or not the shooting operation has ended, using an instruction to end the shooting from the AF control unit 8 or the like as a trigger, and repeats the processing from step S1000 until it is determined that the shooting has ended.

According to this embodiment, it is possible to suppress the system load and the electrical power consumption related to signal processing by controlling the roughness/fineness of distance information acquisition regions for object detection based on the number of objects at the time of AF control during image shooting.

Note that in the above embodiment, distance information acquisition regions for object detection are set based on the number of objects, but a configuration may be adopted in which the movement vector of an object is detected, if it is determined that the possibility that the object other than a main object passes in front of the main object is high, the resolution of distance information acquisition regions is set high, and if it is determined that the possibility is low, the resolution of the distance information acquisition regions is set low.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-086576, filed Apr. 22, 2016 which is hereby incorporated by reference herein in its entirety.

What is claimed is:

1. An image capturing apparatus comprising:
   an image sensor;
   a readout circuit configured to read out a signal from pixels of the image sensor; and
   at least one processor, configured to function as:
      a setting unit configured to set a region in which a plurality of signals having different viewpoints are read out from each pixel of the image sensor by the readout circuit,
      a first information acquisition unit configured to acquire first depth information for detecting an object using a signal read out from a first signal readout region set by the setting unit,
      an evaluation information acquisition unit configured to acquire evaluation information for detecting a focus state of an object using a signal read out by the readout circuit, and
      a control unit configured to control a signal readout amount of the first signal readout region from the pixels of the image sensor by the readout circuit, based on the focus state determined based on the evaluation information.

2. An image capturing apparatus comprising:
   an image sensor;
   a readout circuit configured to read out a signal from pixels of the image sensor; and
   at least one processor, configured to function as:
      a setting unit configured to set a region in which a plurality of signals having different viewpoints are read out from each pixel of the image sensor by the readout circuit,
      a first information acquisition unit configured to acquire first depth information for detecting an object using a signal read out from a first signal readout region set by the setting unit,
      an evaluation information acquisition unit configured to acquire evaluation information for detecting a focus state of an object using a signal read out by the readout circuit, and
      a control unit configured to control a signal readout amount of the first signal readout region from the pixels of the image sensor by the readout circuit, based on the number of objects detected based on the first depth information.

3. The apparatus according to claim 1, wherein the at least one processor is further configured to function as:
   a second information acquisition unit configured to acquire second depth information for detecting a focus state of an object using a signal read out from a second signal readout region set by the setting unit,
   an object detection unit configured to detect a position and a size of an object and the number of objects based on the first depth information, and
   a focus adjustment unit configured to determine a focus state of an object based on the second depth information and to perform focus adjustment so as to bring the object into an in-focus state.

4. The apparatus according to claim 3, wherein the first signal readout region is a region that is arranged discretely over an entire screen and is set for object detection performed by the object detection unit, and the second signal readout region is a region that is arranged locally on the screen and is set for focus adjustment performed by the focus adjustment unit.

5. The apparatus according to claim 1, wherein the closer the evaluation information is to the in-focus state, the finer the control unit sets the first signal readout region, and the farther the evaluation information is from the in-focus state, the rougher the control unit sets the first signal readout region.

6. The apparatus according to claim 1, wherein the greater a number of objects is, the finer the control unit sets the first signal readout region, and the smaller the number of objects is, the rougher the control unit sets the first signal readout region.

7. The apparatus according to claim 5, wherein the closer the evaluation information is to the in-focus state, the higher the control unit sets a resolution of the first signal readout region, and the farther the evaluation information is from the in-focus state, the lower the control unit sets the resolution of the first signal readout region.

8. The apparatus according to claim 6, wherein the greater the number of objects is, the higher the control unit sets the resolution of the first signal readout region, and the smaller the number of objects is, the lower the control unit sets the resolution of the first signal readout region.

9. The apparatus according to claim 3, wherein the first depth information and the second depth information are information regarding a distance of an object acquired by performing correlation calculation on the signals having different viewpoints, and the evaluation information is information regarding a contrast of an object acquired from a signal acquired by adding together the signals having different viewpoints.

10. The apparatus according to claim 1, wherein in the image sensor, a plurality of photoelectric conversion portions are assigned to one microlens.

11. A control method of an image capturing apparatus which has an image sensor, a readout circuit configured to read out a signal from pixels of the image sensor, and a setting unit configured to set a region in which a plurality of signals having different viewpoints are read out from each pixel of the image sensor by the readout circuit, the method comprising:
    acquiring first depth information for detecting an object using a signal read out from a first signal readout region set by the setting unit;
    acquiring evaluation information for detecting a focus state of an object using a signal read out by the readout circuit; and
    controlling a signal readout amount of the first signal readout region from the pixels of the image sensor by the readout circuit, based on the focus state determined based on the evaluation information.

12. A control method of an image capturing apparatus which has an image sensor, a readout circuit configured to read out a signal from pixels of the image sensor, and a setting unit configured to set a region in which a plurality of signals having different viewpoints are read out from each pixel of the image sensor by the readout circuit, the method comprising:
    acquiring first depth information for detecting an object using a signal read out from a first signal readout region set by the setting unit;
    acquiring evaluation information for detecting a focus state of an object using a signal read out by the readout circuit; and
    controlling a signal readout amount of the first signal readout region from the pixels of the image sensor by the readout circuit, based on the number of objects detected based on the first depth information.

13. A non-transitory computer-readable storage medium storing a program for causing a computer to execute a control method of an image capturing apparatus which has an image sensor, a readout circuit configured to read out a signal from pixels of the image sensor, and a setting unit configured to set a region in which a plurality of signals having different viewpoints are read out from each pixel of the image sensor by the readout circuit, the method comprising:
    acquiring first depth information for detecting an object using a signal read out from a first signal readout region set by the setting unit;
    acquiring evaluation information for detecting a focus state of an object using a signal read out by the readout circuit; and
    controlling a signal readout amount of the first signal readout region from the pixels of the image sensor by the readout circuit, based on the focus state determined based on the evaluation information.

14. A non-transitory computer-readable storage medium storing a program for causing a computer to execute a control method of an image capturing apparatus which has an image sensor, a readout circuit configured to read out a signal from pixels of the image sensor, and a setting unit configured to set a region in which a plurality of signals having different viewpoints are read out from each pixel of the image sensor by the readout circuit, the method comprising:
    acquiring first depth information for detecting an object using a signal read out from a first signal readout region set by the setting unit;
    acquiring evaluation information for detecting a focus state of an object using a signal read out by the readout circuit; and
    controlling a signal readout amount of the first signal readout region from the pixels of the image sensor by the readout circuit, based on the number of objects detected based on the first depth information.

* * * * *